(12) United States Patent
Yin et al.

(10) Patent No.: US 10,728,549 B2
(45) Date of Patent: Jul. 28, 2020

(54) ADAPTIVE LOOP FILTERING FOR HIGH-DYNAMIC RANGE VIDEO

(71) Applicant: Dolby Laboratories Licensing Corporation, San Francisco, CA (US)

(72) Inventors: Peng Yin, Ithaca, NY (US); Taoran Lu, Santa Clara, CA (US); Fangjun Pu, Sunnyvale, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/180,775

(22) Filed: Nov. 5, 2018

(65) Prior Publication Data

US 2019/0141321 A1    May 9, 2019

Related U.S. Application Data

(60) Provisional application No. 62/581,874, filed on Nov. 6, 2017.

(51) Int. Cl.
*H04N 19/117* (2014.01)
*H04N 19/82* (2014.01)
*H04N 19/136* (2014.01)

(52) U.S. Cl.
CPC ......... *H04N 19/117* (2014.11); *H04N 19/136* (2014.11); *H04N 19/82* (2014.11)

(58) Field of Classification Search
CPC .... H04N 19/70; H04N 19/463; H04N 19/117; H04N 19/96; H04N 19/44; H04N 19/182; H04N 19/82; H04N 19/14; H04N 19/186; H04N 19/184; H04N 19/11; H04N 19/176; H04N 19/30; H04N 19/36; H04N 19/59; H04N 19/105; H04N 19/136; H04N 19/196; H04N 19/197; H04N 19/46; H04N 19/593; H04N 19/187; H04N 19/86; H04N 19/587; H04N 19/103; H04N 19/119; H04N 19/129; H04N 19/13; H04N 19/147; H04N 19/157; H04N 19/159; H04N 19/33;
(Continued)

(56) References Cited

U.S. PATENT DOCUMENTS

2011/0142136 A1*  6/2011  Liu .......................... G06T 5/20
                                                    375/240.18
2014/0140416 A1*  5/2014  Yamazaki ............... H04N 19/82
                                                    375/240.25
(Continued)

FOREIGN PATENT DOCUMENTS

WO    2017/195532    11/2017
WO    2019/006300    1/2019

OTHER PUBLICATIONS

Li et al. "Complexity Reduction of an Adaptive Loop Filter Based on Local Homogeneity" IEIE 2017, 9 pages. (Year: 2017).*
(Continued)

*Primary Examiner* — Nathnael Aynalem

(57) ABSTRACT

Methods, processes, and systems are presented for adaptive loop filtering in coding and decoding high dynamic range (HDR) video. Given an input image block, its luminance information may be used to adapt one or more parameters of adaptive loop filtering and compute gradient and directionality information, activity information, a classification index, and adaptive-loop-filtering coefficients.

12 Claims, 5 Drawing Sheets

(58) Field of Classification Search
CPC ........ H04N 19/34; H04N 19/50; H04N 19/60; H04N 19/615; H04N 19/80; H04N 19/91; H04N 19/172
USPC .......................................... 375/240.01–240.29
See application file for complete search history.

(56) References Cited

U.S. PATENT DOCUMENTS

| | | | | |
|---|---|---|---|---|
| 2018/0041779 | A1* | 2/2018 | Zhang | H04N 19/18 |
| 2018/0124400 | A1* | 5/2018 | He | H04N 19/46 |
| 2018/0288441 | A1* | 10/2018 | Zhang | H04N 19/44 |
| 2018/0352225 | A1* | 12/2018 | Guo | H04N 19/117 |
| 2019/0116359 | A1* | 4/2019 | Dong | H04N 19/105 |

OTHER PUBLICATIONS

Kesireddy "A New Adaptive Trilateral Filter for In-Loop Filtering" Purdue University 2014. (Year: 2014).*

Karczewicz, M. et al., "Geometry transformation-based adaptive in-loop filter", 2016 Picture Coding Symposium (PCS), Year: 2016, pp. 1-5.

Chen, J. et al., "Algorithm Description of Joint Exploration Test Model 7 (JEM7)" JVET-G1001, Torino, IT, Jul. 2017.

Rosewarne, C. et al., "high efficiency video coding (HEVE) test model 16 (HM16) improved encoder description update 8", JCTVC-AA1002, Hobart, AU, Apr. 2017.

Samuelsson, J. et al., "conversion and coding practices for HDR/WCG Y'CbCr 4:2:0 video with PQ transfer characteristics (Draft 4)", JCTVC-Z1017, Geneva, CH, Jan. 2017.

Irisawa,H. et al., "Results of core experiment N1, post-filter specified in VM7.0 has been performed and compared with non-filtered VM in terms of PSNR and subjective qualitive", 40 MPEG meeting Jul. 21, 1997 to Jul. 25, 1997, Stockholm, (Motion picture expert group or ISO/IEC JTCI/SC29/WG11)., No. M2500, Jul. 14, 1997(Jul. 14, 1997), XP030031772, *Section 1, Penultimate Paragraph, Lines 1-2*.

ITU-R BT.709-6 "Parameter Values for the HDTV Standards for Production and International Programme Exchange" Jun. 2015.

ITU-R BT.2100-0,"Image Parameter Values for High Dynamic Range Television for use in Production and International Programme Exchange" Jul. 2016.

ITU-R BT.2020 "Parameter Values for Ultra-High Definition Television Systems for Production and International Programme Exchange" Aug. 2012.

SMPTE 2084 "High Dynamic Range Electro-Optical Transfer Function of Mastering Reference Displays" 2014.

Tsai, C. et al., "Adaptive Loop Filtering for Video Coding", IEEE Journal of Selected Topics in Signal Processing, Year: 2013, vol. 7, Issue: 6, pp. 934-945.

* cited by examiner

ADAPTIVE LOOP FILTERING FOR HIGH-DYNAMIC RANGE VIDEO

CROSS-REFERENCE TO RELATED APPLICATION

The present application claims priority from U.S. Provisional Patent Application No. 62/581,874 filed Nov. 6, 2017, which is incorporated by reference in its entirety.

TECHNOLOGY

The present invention relates generally to images and video coding. More particularly, an embodiment of the present invention relates to an adaptive loop filter for coding high dynamic range images and video.

BACKGROUND

In 2013, the MPEG group in the International Standardization Organization (ISO), jointly with the International Telecommunications Union (ITU), released the first draft of the HEVC (also known as H.265) video coding standard. More recently, the same group has released a call for evidence to support the development of a next generation coding standard that provides improved coding performance over existing video coding technologies.

As used herein, the term 'bit depth' denotes the number of pixels used to represent one of the color components of an image. Traditionally, images were coded at 8-bits, per color component, per pixel (e.g., 24 bits per pixel); however, modern architectures may now support higher bit depths, such as 10 bits, 12 bits or more.

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, and the "PQ" (perceptual quantization) curve, described in SMPTE ST 2084 and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution.

In video coding, the term "in-loop filtering" refers to filtering processes that apply to reconstructed images and affect both the quality of the video output and the quality of the reference pictures used for motion compensation. These in-loop filters are distinct from other, optional, post-processing filters that may still be applied by a decoder. For example, in HEVC, in-loop filters include a deblocking filter and the sample-adaptive offset (SAO) filter. These filters are also commonly denoted as "loop filters" (e.g., block 130 in FIG. 1A or block 150 in FIG. 1B).

As appreciated by the inventors here, as development begins for the next generation of a video coding standard, improved techniques for adaptive loop filters are desired. Methods of this invention can be applicable to a variety of video content, including, but not limited, to content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Adaptive loop filtering for high-dynamic range video is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to adaptive loop filtering for HDR video. A processor receives an input image. For an input block of the input image, the processor: generates a luminance class value for the input block based on luminance information of pixels in the input block. If, based on the luminance class value, the input block is classified as a high dynamic-range (HDR) block, then the processor computes based on the luminance values of pixels in the input block an HDR ALF directionality value and/or an HDR quantized ALF activity value. The processor generates an HDR ALF class value based on the luminance class value and the HDR ALF directionality and/or the HDR ALF activity values, it generates HDR ALF filtering coefficients for the HDR ALF class value, and generates pixel values of an output filtered block based on pixel values of the input block and the HDR ALF filtering coefficients.

Adaptive Loop Filtering

Figure 1A:
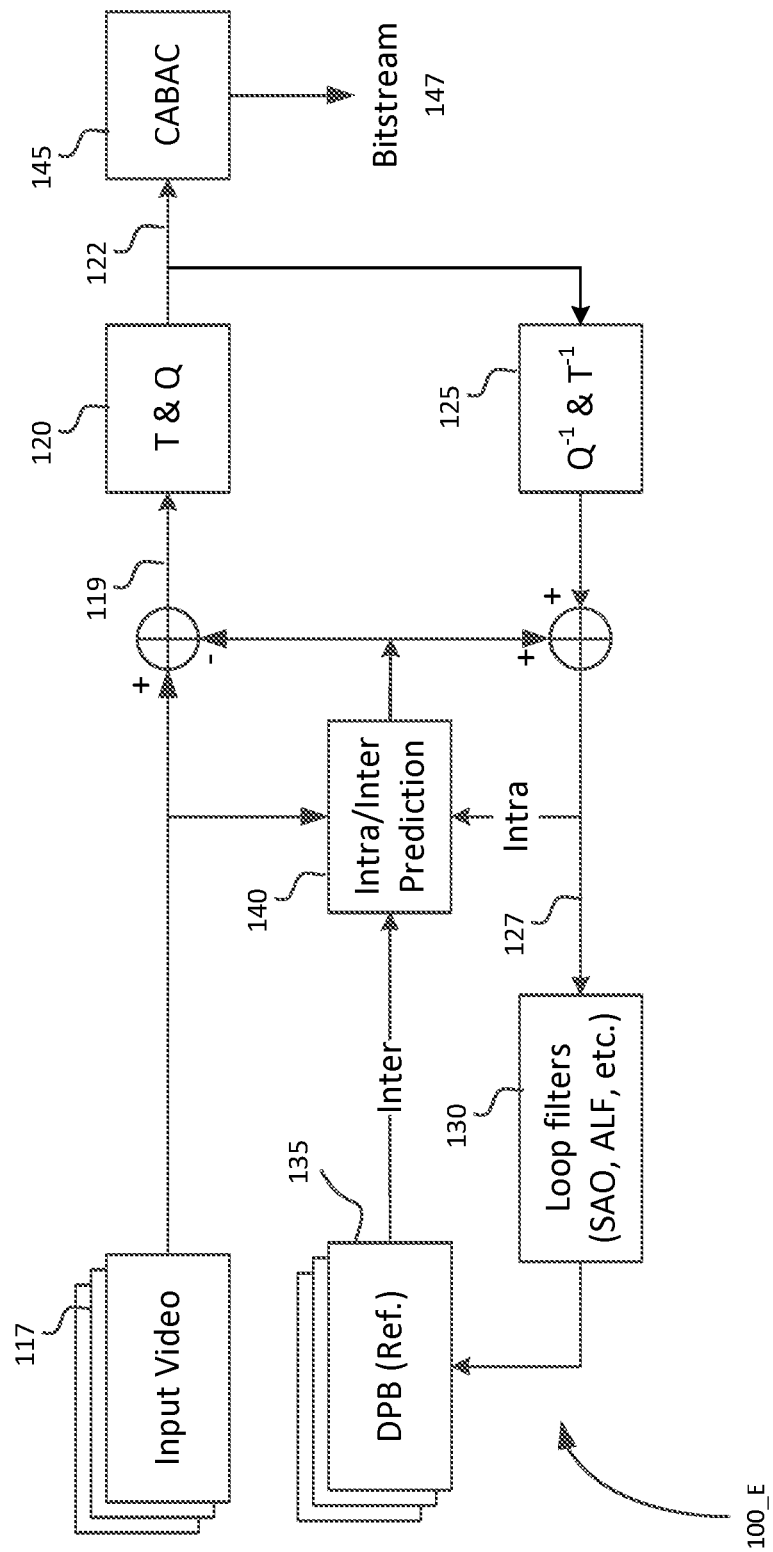
FIG. 1A depicts an example encoder using adaptive in-loop filtering according to an embodiment of this invention.

FIG. 1A depicts an example process (100_E) for video encoding according to an embodiment. Using either intra or inter-coding (140), pixel values of input video (117) or residuals (119) are transformed and quantized (120). The quantized values (122) are further encoded using lossless coding (145) (e.g., CABAC) to generate a coded bitstream (147). Given the quantized values (122), after applying an inverse quantization and an inverse transformation (125), motion-compensated values (127) may be processed by loop filters (130), which may include an adaptive loop filter (ALF). The output of the loop filters is stored in the decoded picture buffer (DPB) (135) to be used for inter or intra prediction (140).

Figure 1B:
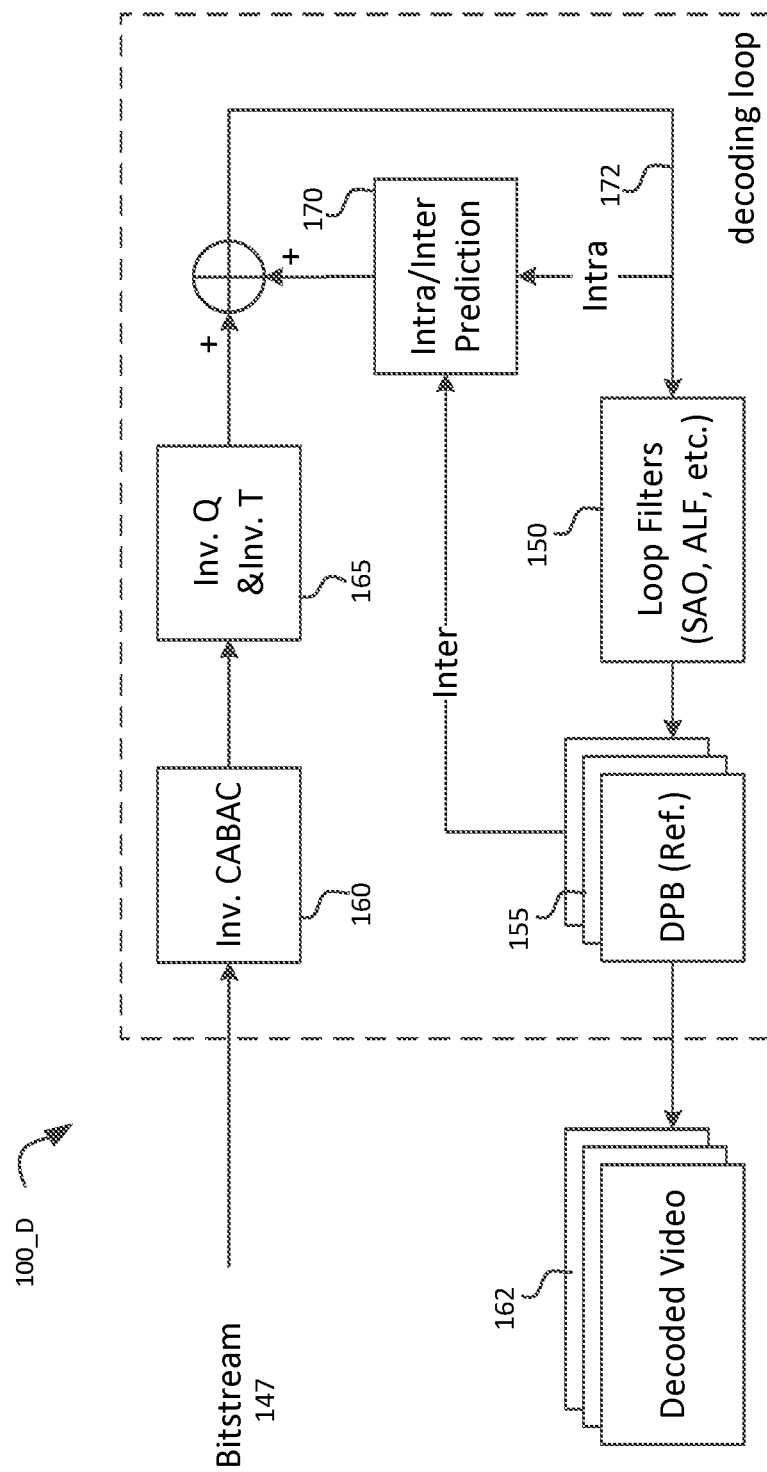
FIG. 1B depicts an example decoder using adaptive in-loop filtering according to an embodiment of this invention.

FIG. 1B depicts an example process (100_D) for video decoding according to an embodiment. Given a coded bitstream (147), its data are processed by an inverse lossless decoder (160) (e.g., inverse CABAC), followed by inverse quantization and inverse transformation (165). Following intra or inter prediction (170), motion-compensated data (172) are processed again by loop filters (150), which may include an adaptive loop filter (ALF). The output of the loop filters (150) is stored in the decoded picture buffer (155) to be used for inter or intra prediction (170) or to generate decoded video (162).

The concept of an adaptive loop filtering (ALF) was first introduced during the development of the H.265 (HEVC) standard. ALF has been shown to improve coding efficiency [1]; however, due to its complexity, it was not included in the final HEVC specification. Most recently, a version of ALF is part of the tools under consideration by the ISO/MPEG Joint Video Exploration Team (JVET) [2][3]. ALF is designed to minimize the distortion between the original samples and the decoded samples by using a Wiener-based adaptive filter. The filter coefficients are estimated at the encoder and are explicitly signaled to the decoder. To achieve better coding efficiency, especially for high resolution video, local adaptation can be used by applying different filters to different regions or blocks in a picture. In addition to enabling filtering adaptations, ALF can be turned on or off at various levels of pixel resolution, such as at the coding tree unit (CTU), the block, or the region level.

All the existing ALF designs are based on the luminance and chroma characteristics of SDR videos. In this invention, several new technologies to enhance the ALF coding performance for HDR video are proposed. As an example, a first embodiment expands upon a specific ALF technology adopted in the Joint Exploration Test Model (JEM) software [3]. BT. 2100 defines two transfer functions for coding HDR content: PQ (Perceptual Quantization) and HLG (Hybrid Log-Gamma). While most of the examples assume coding using PQ, the proposed methodologies can also be applied to HDR video using HLG or other quantization functions, as defined by either future standards or current and/or future proprietary methods.

Review of ALF in JEM

Figure 2A:
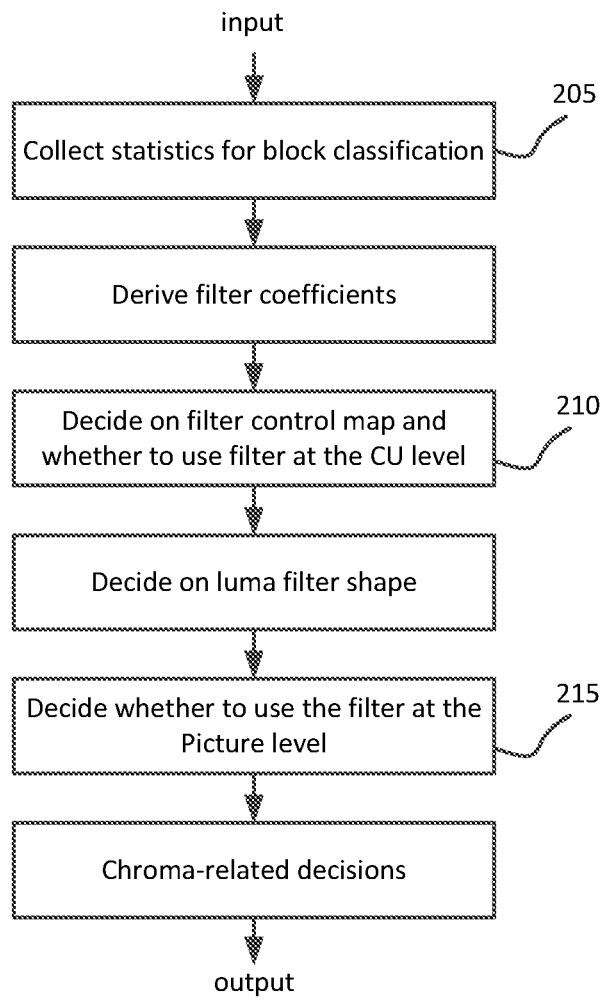
FIG. 2A depicts an example process for SDR-based adaptive loop filtering in an encoder according to prior art.
Figure 2B:
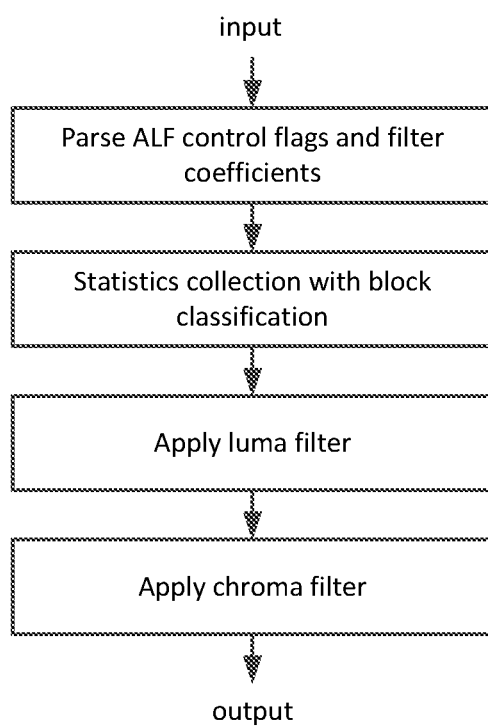
FIG. 2B depicts an example process for SDR-based adaptive filtering in a decoder according to prior art.

JEM has adopted a block-based ALF scheme. For the luma component, an image is divided into none-overlapping 2×2 blocks, and each block is categorized into one of 25 possible classes based on the direction and activity of local gradients. A filter is designed for each class using pixels included in this class. This scheme is also called GALF (Geometry Transformation-based Adaptive In-loop Filter). In this Section, the key elements in GALF are reviewed. Additional details can be found in [3]. Example flow-charts of an ALF encoder process and an ALF decoder process, according to prior art [3] are illustrated in FIG. 2A and FIG. 2B.

Block Classification

In block classification (205), each 2×2 block is categorized into one of 25 classes. The classification index C is derived based on the directionality (D) of the block and a quantized value of activity $\hat{A}$, as follows:

$$C = 5D + \hat{A}. \tag{1}$$

To calculate D and $\hat{A}$ in equation (1), gradients of the horizontal, vertical and two diagonal directions are first calculated using the 1-D Laplacians with information of the pixel values in surrounding blocks:

$$g_v = \Sigma_{k=i-2}^{i+3} \Sigma_{l=j-2}^{j+3} V_{k,l}, V_{k,l} = |2R(k,l) - R(k,l-1) - R(k,l+1)|, \tag{2}$$

$$g_h = \Sigma_{k=i-2}^{i+3} \Sigma_{l=j-2}^{j+3} H_{k,l}, H_{k,l} = |2R(k,l) - R(k-1,l) - R(k+1,l)|, \tag{3}$$

$$g_{d1} = \Sigma_{k=i-2}^{i+3} \Sigma_{l=j-2}^{j+3} D1_{k,l}, D1_{k,l} = |2R(k,l) - R(k-1,l-1) - R(k+1,l+1)| \tag{4}$$

$$g_{d2} = \Sigma_{k=i-2}^{i+3} \Sigma_{j=j-2}^{j+3} D2_{k,l}, D2_{k,l} = |2R(k,l) - R(k-1,l+1) - R(k+1,l-1)|. \tag{5}$$

Indices i and j refer to the coordinates of the upper left sample in the 2×2 block and R(i, j) indicates a reconstructed sample at coordinate (i,j). To assign the value for D in the range (0, 4), ratios of horizontal and vertical gradient and ratio of diagonal gradients are used:

$$r_{h,v} = \frac{\max(g_h, g_v)}{\min(g_h, g_v)}, r_{d1,d2} = \frac{\max(g_{d1}, g_{d2})}{\min(g_{d1}, g_{d2})}. \tag{6}$$

Then, given thresholds $t_1$ and $t_2$ (e.g., $t_1=2$, $t_2=4.5$), Table 1 describes how D is assigned.

TABLE 1

| D assignment based on threshold values |
|---|
| Texture (D = 0): if $r_{h,v} <$ and $r_{d1,d2} < t_1$ |
| Diagonal: if $r_{d1,d2} > r_{h,v}$, |
| Weak (D = 1): if $r_{d1,d2} < t_2$, |
| Strong (D = 2): if $r_{d1,d2} \geq t_2$ |
| Horizontal/Vertical: if $r_{h,v} > r_{d1,d2}$ |
| Weak (D = 3): if $r_{h,v} < t_2$ |
| Strong (D = 4): if $r_{h,v} \geq t_2$ |

A first activity value A is calculated based on ALF gradient values, for example, as:

$$A = \Sigma_{k=i-2}^{i+3} \Sigma_{l=j-2}^{j+3} (V_{k,l} + H_{k,l}). \tag{7}$$

An integer activity value $Aq_{ind}$ is given as follows:

$$Aq_{ind} = (24*A) \gg 13, \tag{8}$$

where "c=a»b" denotes a right shift of a by b bits, or $c=a/2^b$, the value of $Aq_{ind}$ is further quantized to the range of 0 to 4, inclusively, and the quantized value is denoted as $\hat{A}$ or Aq. Table 2 provides an example association between the $Aq_{ind}$ and Aq values for SDR content.

TABLE 2

Aq value determination in ALF

| Aq$_{ind}$ | Aq or Â |
|---|---|
| 0 | 0 |
| 1 | 1 |
| 2 to 6 | 2 |
| 7 to 13 | 3 |
| 14 or higher | 4 |

Geometry Transformation of Filter Coefficients

For each class, one set of filter coefficients may be signaled. To distinguish different directions of blocks marked with the same category index, four geometry transformations, including: no transformation, diagonal, vertical flip and rotation, are introduced. The transformation is based on which two of the four gradients (equations (2)-(5)) are larger. Therefore, different filters could be obtained without increasing the bit-overhead of the filter coefficients.

Signaling of Filter Parameters

GALF allows for up to 25 sets of luma-filter coefficients. To reduce the bits overhead of coding ALF filter parameters, several techniques have been used, such as: 1) filter coefficients from difference classes can be merged; 2) temporal prediction of ALF coefficients can be used for inter coded frames; 3) fixed filters prediction can be used for intra coded frames.

The filtering process of the luma component (e.g., Y in YCbCr) can be controlled at the coding unit (CU) level (e.g., see block (210) in FIG. 2A). A flag is signalled to indicate whether ALF is applied to the luma component of a CU. For a chroma component (e.g., Cb or Cr in YCbCr), ALF signaling is enabled at the picture level only (e.g., see block (215) in FIG. 2A).

Filtering Process

At the decoder side (e.g., see FIG. 2B), when ALF is enabled for a CU, each sample R(i, j) within the CU is filtered, resulting in sample value R'(i, j) as shown in equation (9), where L denotes the filter length, and f(k, l) denotes the decoded filter coefficients.

$$R'(i,j) = \Sigma_{k=-L/2}^{L/2} \Sigma_{l=-L/2}^{L/2} f(k,l) * R(i+k, j+l). \quad (9)$$

Filter Coefficients Derivation and Filter Decision at Encoder

At the encoder, a measure of distortion, denoted as E, is used in the following places:
  During the rate-distortion optimization (RDO) for picture-level decisions: that is, to decide whether to turn ALF on or off and select the luma filter shape
  During the RDO for CU-level decisions: that is, to select the filter control map and decide on whether the CU-level ALF luma filter is on or off
  To derive the filter coefficients In JEM, distortion E is computed using a sum of square errors (SSE) criterion. Given two blocks with the same size, their difference can be computed as $$\text{Diff}(i,j) = \text{Block}A(i,j) - \text{Block}B(i,j). \quad (10)$$

Then, the SSE may be computed as $$SSE = \Sigma_{i,j} \text{Diff}(i,j)^2. \quad (11)$$

The rate-distortion (RD) cost may be described using the following equation:

$$J = E + \lambda * R, \quad (12)$$

where J is the Lagrangian cost, E is distortion, R is rate, and λ is defined as function of the quantization parameter QP. Additional details for rate distortion optimization can be found in [4].

Filter coefficients may be computed in the least-squares sense by mimimizing $$E = \Sigma_{i,j}(S(i,j) - R'(i,j))^2, \quad (13)$$

where S(i,j) denotes source pixel values, R(i,j) denotes reconstructed pixel values before ALF, and R'(i,j) is provided by equation (9).

Adaptive Loop Filtering for HDR Video

Luma Based Classification

HDR video has much higher dynamic range than SDR video. In an embodiment, block classification (C) does not depend only on direction (D) and activity information (Â), but also on luminance information (L). In an embodiment, the classification index C may be derived by its luma band L, directionality D, and a quantized value of activity Â. In some embodiments, the classification index C is a linear combination of its luma band L, directionality D, and a quantized value of activity its luma band L, directionality D, and a quantized value of activity Â, for example, as follows:

$$C = M*N*L + M*D + \hat{A}, \quad (14)$$

where, it is assumed that Â is quantized to be within the range [0, M−1], D is within the range [0, N−1] and L is within the range [0, O−1] (e.g., M=5, N=5, and O=2), for a total of M*N*O classes.

For an input block of the input image, a metric of luminance value of the input block is generated. The luminance range of the input block is divided into two or more bands. The adaptive loop filtering may be applied to one or more or all input blocks of the input image. The metric of luminance value of an input block is a function of the luminance pixel values in the input block. The metric of luminance value of the input block returns a metric luminance value Y that characterizes, for example, the luminance range of the input block in order to distinguish an SDR input block (e.g., having a luminance range equal or below 100 nits) from an HDR input block (e.g., having a luminance range above 100 nits). Upon comparing the metric luminance value Y with a threshold, an HDR input block may be distinguished from an SDR input block. For example, in one embodiment, L can be quantized into two bands based on whether the luminance is within SDR range or not (e.g.., below 100 nits or above 100 nits). When translating [0, 100] nits into a 10-bit codewords in PQ, the range (in PQ) is approximately [0 512], thus, for O=2:

$$L = \begin{cases} 0, & \text{if } Y \leq 512 \\ 1, & \text{otherwise} \end{cases}, \quad (15)$$

where Y indicates the metric luminance value of the input block, for example in PQ. In some embodiments, Y may represent the average luminance value in the input block. In other embodiments, Y may represent the maximum luminance value in the input block or some other suitable function of the luminance pixel values in the input block (e.g., the median, the standard deviation, and the like).

In another embodiment, luminance may be quantized into five bands (e.g., L=0, 1, . . . 4) based, without limitation, to the following luminance ranges: [0 10 nits], (10 nits 100 nits], (100 nits 500 nits], (500 nits 1000 nits], (above 1000 nits). These ranges, in the PQ domain, may be approximated as [0 320], (320 512], (512 640], (640 704], and (above 704).

As an example, consider the case where M=5, N=5, and O=2. Let $$C = 25L + 5D + \hat{A}. \quad (16)$$

for a total of 5*5*2=50 classes.

In another embodiment, to limit the number of classes, let M=5, N=3, and O=2. Then, C=15L+5D+Â for a total of 30 classes. D classes, as described earlier in block classification, may also be reduced. For example, one may merge the weak and strong classes into one class, i.e., one may merge D=1 or 2 into D=1, and merge D=3 or 4 into D=2, while D=0 remains unchanged, reducing the number of D classes from 5 to 3.

In another embodiment, one may perform dynamic classes allocation based on the luma band. For example, for L=0 (SDR video range), one may select to have M=5 and N=5; however, for L=1, one may reduce the value of N, thus having M=5, N=3, for a total of 25+15=40 classes.

Activity and Direction Decision Adjustment

When quantizing activity and direction, in JEM, decisions are based on the assumption that the input video is SDR video coded using a gamma transfer function. In most typical applications, HDR video is coded using either the PQ or the HLG transfer function. Because gamma and PQ transfer functions are different, in an embodiment, activity and direction decision are adjusted to be optimized for HDR content. Two methods are proposed.

Method 1: Separate SDR and HDR Thresholds and Activity Tables

As described in Table 1, decision making components include thresholds $t_1$ and $t_2$. In an embodiment, SDR-related thresholds are kept the same, but two new HDR thresholds are added. The new thresholds ($t_3$ and $t_4$) may be based on training results or they may represent modulated values of $t_1$ and $t_2$. For example:

$$t_{1\_sdr} = t_1, t_{2\_sdr} = t_2,$$

$$t_{1\_hdr} = t_3, t_{2\_hdr} = t_4, \quad (17)$$

where $$t_{1\_hdr} = t_1 * w(Y_{mean}),$$

$$t_{2\_hdr} = t_2 * w(Y_{mean}),$$

where $Y_{mean}$ denotes the mean luminance value for the block and $w(Y_{mean})$ denotes a weighting table (or function) based on the mean luma value.

For Â, again two separate tables are used; one for SDR video (e.g., Table 2) and one for HDR video. For HDR, in an embodiment, the following Table 3 is proposed.

TABLE 3

Aq determination for HDR video

| $Aq_{ind}$ | Aq |
|---|---|
| 0 | 0 |
| 1 | 1 |
| 2 to 5 | 2 |
| 6 to 12 | 3 |
| 13 or higher | 4 |

Method 2: Gradient Adjustments for HDR

In an embodiment, for SDR video, gradient computation is kept the same (see equations (2)-(5)); however, for HDR video the gradients are weighted by the mean luma value of the block under consideration. For example:

$$HDR(V_{k,l}) = w(Y_{mean}) * V_{k,l},$$

$$HDR(H_{k,l}) = w(Y_{mean}) * H_{k,l},$$

$$HDR(D1_{k,l}) = w(Y_{mean}) * D1_{k,l},$$

$$HDR(D2_{k,l}) = w(Y_{mean}) * D2_{k,l}, \quad (18)$$

where again $Y_{mean}$ denotes the mean luminance value for the block and $w(Y_{mean})$ denotes a weighting table (or function) based on mean luma value. The weighting table can be derived based on the characteristics of the PQ, HLG, or gamma mappings, or through some empirical data. For example, w( ) can take the function defined in the JCTVC recommended practices for HDR coding [6] as $$Q = \max(-3, \min(6, 0.015 * Y - 7.5)),$$

$$w(Y) = pow\left(2.0, \frac{Q}{3.0}\right),$$

where c=pow(a, b) denotes the power function $c = a^b$.

In another embodiment, w( ) can also be derived from a reshaping function, if such a reshaping is used for the HDR video coding, as:

$$w(Y) = pow(slope(FWD(Y)), 2);$$

where FWD( ) is the forward reshaping function; and slope(x) represents the first derivative of FWD( ) which can be evaluated numerically as slope(x)=(FWD(x+dx)−FWD(x−dx))/(2dx) (see equation (6) in [5]), or it can be solved with standard math theory if the close form representation of the forward reshaping function FWD( ) is available. For example, in some embodiments the forward reshaping function is expressed as a piecewise function of first or second-order segments.

In other embodiments, instead of using mean luminance to derive the weighting factor, one may use other metrics of interest that characterize the dynamic range of the luminance pixel values in the block, such as the variance of luminance values in the block or the standard deviation of luminance values in the block.

In another embodiment, weighting can be an integral part of computing the gradient. For example, from equation (2):

$$V_{k,l} = |2R(k,l) - R(k,l-1) - R(k,l+1)|.$$

In an embodiment, this expression may be adjusted for HDR signals as $$V_{k,l} = |2*w(R(k,l))*R(k,l) - w(R(k,l-1))*R(k,l-1) - w(R(k,l+1))*R(k,l+1)|, \quad (19)$$

where w(R(i,j)) is a function of the luminance value in R(i,j).

Alternatively, there might be no adjustments to the gradient computations, but one may adjust the first activity value A with a luma-based weighting factor, as in $$HDR(A) = w(Y_{mean}) * A. \quad (20)$$

Prediction of ALF Filtering Coefficients

To save bits overhead for coding the ALF filter coefficients, filter prediction is used. For intra pictures, fixed predictors are used. For HDR video, embodiments modify the classes using the L classifier discussed earlier.

Method 1: Separate ALF filters for SDR and HDR

In one embodiment, two separate sets of fixed filters are used: one set for SDR video and one set for HDR video. The set for HDR filters should be derived based on HDR training clips. As an example, the training process to derive HDR ALF filter coefficients may include the following steps of a "greedy" optimization method which attempts to find the best set of filters in a large set of potential filters. More specifically, the goal is to find the best N filters from a set of M training filters (M≥N) (e.g., M=100, N=16), to minimize $$\Sigma_{k \in 0 \ldots M-1}(\min_{l \in 0 \ldots N-1} \text{cost}(F_k, F_l)), \quad (21)$$

where cost( ) denotes a cost function (e.g., SSE) that compares the output of two filters, $F_k$ denotes a filter from the set of M filters and $F_l$ denotes a filter from the set of N filters.

Furthermore, one should:
  disable fixed predictors in the software (note: this is to prevent bias toward any filter)
  enable ALF for a training set of video clips. For each class, gather filter coefficients from intra coded frames (note: duplicate filters for each class can be removed in this step or later in filter decision steps)
  for each class, when computing a filter response, the magnitude can be used to compute distortion between two filters.

Then one may apply a greedy or some other algorithm to minimize equation (21).

Method 2: Single Set of Filters for SDR and HDR

In another embodiment, only one set of ALF filters is being used. Using the L classifier as a guide, SDR video uses the part of fixed filters corresponding to the SDR luma band while HDR video can use all the fixed filters. That is, some filters are for SDR luma band and the other filters are used for all luma bands. In an embodiment, the classes which contain only SDR luma bands have a smaller class index. Therefore, for fixed filters, SDR video uses the lower index filters and HDR video can use all of them. For example, when having 50 classes, for L=0, the first 25 sets of fixed filters may be copies from original ALF filters for SDR content. For HDR content, an additional set of 25 sets of fixed filters need to be derived based on training HDR video sequences.

Encoder Only Considerations

For PQ-coded HDR video, to improve the subjective quality of coded video, JEM [6] uses a QP adaptation method based on luma values. Because QP can be changed at the block level, λ needs to be adapted based on the QP value as well. In ALF, RDO may be used at the picture-level and/or CU-level decisions. Since it is hard to know which is the right QP value to be used, in an embodiment, a weighted distortion $E_w$ is being used to match the QP change. For example, $$J = E_w + \lambda_{frame} * R, \quad (22)$$

where $E_w$ denotes a weight distortion and the weight table is built based on pixel values. From equation (10), a weighted difference may be computed as $$\text{Diff}_w(i,j) = w(\text{Block}A(i,j)) * (\text{Block}A(i,j) - \text{Block}B(i,j)). \quad (23)$$

Then, the weighted SSE may be computed as $$\text{SSE}_w = \Sigma_{i,j} \text{Diff}_w(i,j)^2, \quad (24)$$

where w( ) a denotes weighting table or function based on pixel values. In JEM, $w = 2^{(dQP/3)}$ and dQP is generated from a look-up table (LUT) based on the luma values.

For HDR content, in an encoder, the following additional steps are suggested to improve ALF processing.
  Apply the weighted distortion $E_w$ in all RD-cost-related computations.
  When computing filter coefficients, apply a weighted least square function. That is, for filter coefficient estimation, solve a weighted least square problem by mimimizing $$E_w = \Sigma_{i,j} w(S(i,j)) * (S(i,j) - R'(i,j))^2. \quad (25)$$

As discussed in [5], certain HDR coding and decoding schemes may use reshaping. When reshaping is being used, the following should also be taken into considerations.
1) for out-of-loop reshaping, for luma classification, the luma band codeword boundary should be modified using the forward reshaping LUT. Other technologies might not be used.
2) for in-loop residue reshaping, methods described in this section may be applied as is.

Figure 3:
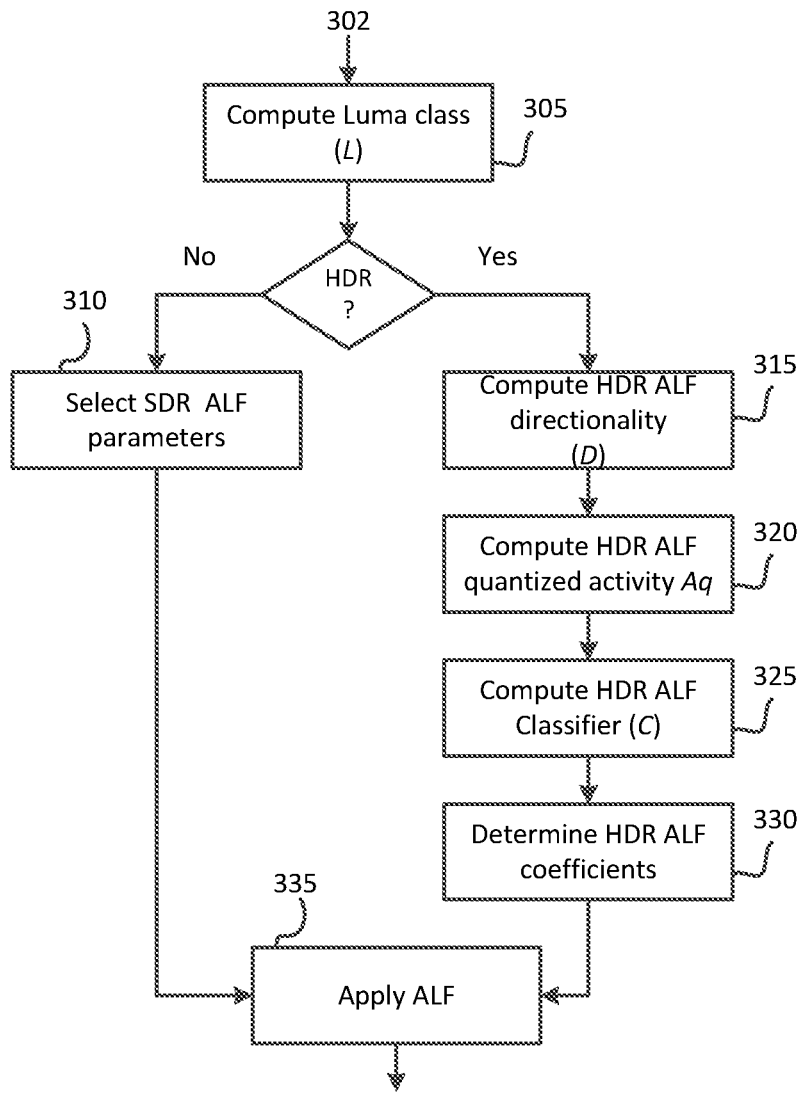
FIG. 3 depicts an example process for adaptive loop filtering for HDR video according to an embodiment of this invention.

FIG. 3 depicts an example process flow for adaptive loop filtering for HDR video according to an embodiment. Given an input block (302), step (305) determines its luma class value (L) based on a function of the luminance values of its pixels (e.g., using equation (15)). If the luma class classifies the block as an SDR block, then selecting ALF parameters proceeds according to an SDR-based adaptive loop filtering process (310) (e.g., equations (1)-(13)). Otherwise, one or more of the following steps may be performed:
  a) step 315: compute HDR-based gradients (e.g., using equations (18)-(19))
  b) step 320: compute HDR-based activity value (e.g., using Table 3 and/or equation (20))
  c) step 325: compute HDR-based classifier (e.g., using equation (14))
  d) step 330: compute HDR-based filter coefficients (e.g., using equations (21-25)

Finally, given the proper ALF coefficients, the output of the adaptive-loop filter is computed in step 335 (e.g., using equation (9)).

In a decoder, a similar process may be used as well, except that in step (330), instead of explicitly computing the ALF coefficients, those are extracted from the received bitstream.

Syntax

In an embodiment, ALF enhancements for HDR input video may be signaled using a single flag, say flag alf_enh_enabled_flag, at the Sequence Parameter Set (SPS) level. An example is depicted in Table 4.

TABLE 4

| Example syntax to enable ALF enhancements for HDR video | |
|---|---|
| | Descriptor |
| SPS( ) | |
| ...... | |
| alf_enh_enabled_flag | u(1) |
| ...... | | alf_enh_enabled_flag equal to 1 specifies that ALF enhancements for HDR are used in the coded video sequence (CVS). alf_enh_enabled_flag equal to 0 specifies that ALF enhancements for HDR are not used in the CVS.

REFERENCES

Each one of the references listed herein is incorporated by reference in its entirety.
[1] C-Y. Tsai, et al., "Adaptive Loop Filtering for Video Coding," IEEE Journal of Selected Topics in Signal Processing, vol. 7, No. 6, December pp. 934-945, 2013.

[2] M. Karczewicz, L. Zhang, W. Chien, and X. Li, "Geometry Transformation-based Adaptive In-loop Filter," PCS, 2016.

[3] J. Chen, E. Alshina, G. Sullivan, J. Ohm, and J. Boyce, "Algorithm Description of Joint Exploration Test Model 7 (JEM 7)," JVET-G1001, Torino, IT, July 2017.

[4] C. Rosewarne, et al., (Editors), "High Efficiency Video Coding (HEVC) Test Model 16 (HM16) Improved Encoder Description Update 8," JCTVC-AA1002, Hobart, A U, April 2017.

[5] Provisional U.S. Patent Application, Ser. No., 62/561,561, filed on Sept. 21, 2017, "Integrated Image Reshaping and Video Coding," by T. Lu et al.

[6] J. Samuelsson, et al., "Conversion and Coding Practices for HDR/WCG Y'CbCr 4:2:0 Video with PQ Transfer Characteristics (Draft 4)," JCTVC-Z1017, Geneva, CH, January 2017.

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to adaptive loop filtering for HDR video, such as those described herein. The computer and/or IC may compute any of a variety of parameters or values that relate to adaptive loop filtering for HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive loop filtering for HDR video as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to adaptive loop filtering for HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for adaptive loop filtering (ALF) of high dynamic range (HDR) video, the method comprising:
    accessing with a processor an input image;
    for an input block of the input image comprising luminance pixel values within a luminance range: generating a metric of luminance value of the input block, Wherein the metric of luminance value of the input block is based on a function of the luminance pixel values in the input block;
    dividing the luminance range of the input block into two or more bands;
    generating a luminance class value according to a band among the two or more bands that contains the metric of luminance value of the input block; and
    if the metric of luminance value of the input block exceeds a threshold, then computing, based on the luminance pixel values in the input block, an HDR ALF directionality value and/or an HDR quantized ALF activity value;
    generating an HDR ALF class value based on the luminance class value and the HDR ALF directionality value and/or the HDR quantized ALF activity value;
    generating HDR ALF filtering coefficients for the HDR ALF class value; and
    generating pixel values of an output filtered block based on pixel values of the input block and the HDR ALF filtering coefficients, wherein computing the HDR ALF directionality value comprises:
    computing standard dynamic range (SDR) ALF gradients according to an SDR ALF process;
    computing corresponding HDR ALF gradients by multiplying each SDR ALF gradient with a weight function based on an average luminance value in the input block; and computing the HDR directionality based on the HDR ALF gradients.

2. The method of claim 1, wherein the metric of luminance value of the input block is one of maximum luminance pixel value, an average luminance pixel value, a median, and a standard deviation of the luminance pixel values in the input block.

3. The method of claim 1, wherein the luminance range of the input block is divided into two bands or five bands.

4. The method of claim 1, wherein computing the HDR directionality value further comprises applying on one or more HDR thresholds that are different than thresholds being used to compute directionality in the SDR ALF process based on the SDR ALF gradients.

5. The method of claim 1, wherein computing an HDR ALF activity value comprises:
- computing an SDR ALF activity value according to an SDR ALF process; and
- computing the HDR ALF activity value by multiplying the SDR ALF activity value with a weight function based on the average luminance in the input block.

6. The method of claim 1, wherein computing an HDR quantized ALF activity value comprises:
- computing a first activity value based on HDR ALF gradient values;
- generating an integer activity value based on the first activity value; and
- mapping the integer activity value to the HDR quantized ALF activity values according to a mapping table.

7. The method of claim 6, wherein the mapping table comprises:

| $Aq_{ind}$ | Aq or $\hat{A}$ |
|---|---|
| 0 | 0 |
| 1 | 1 |
| 2 to 5 | 2 |
| 6 to 12 | 3 |
| 13 or higher | 4 | wherein $Aq_{ind}$ denotes integer activity values and Aq or $\hat{A}$ denotes the corresponding HDR quantized ALF activity values.

8. The method of claim 1, wherein generating an HDR ALF class value (C) comprises computing $$C = M*N*L + M*D + \hat{A},$$

where, L denotes the luminance class value, D denotes the HDR directionality value, $\hat{A}$ denotes the HDR quantized activity value, M denotes the total number of possible HDR quantized activity values, and N denotes the total number of possible HDR directionality values.

9. The method of claim 1, wherein, in a decoder, generating HDR ALF filtering coefficients for the HDR ALF class value comprises:
- parsing by the decoder a coded bitstream comprising a coded representation of the input image; and
- extracting the HDR ALF filtering coefficients from the coded bitstream.

10. The method of claim 1, wherein, in an encoder, generating HDR ALF filtering coefficients for the HDR ALF class value comprises minimizing $$E_W = \Sigma_{i,j} w(S(i,j)) * (S(i,j) - R'(i,j))^2,$$

where S(i,j) denotes pixel values of the input block, R'(i, j) denotes pixel values of the output filtered block, and w(S(i,j)) denotes a function of luminance in pixel S(i,j).

11. An apparatus comprising a processor and configured to perform the method recited in claim 1.

12. A non-transitory computer-readable storage medium having stored thereon computer-executable instructions for executing a method with one or more processors in accordance with claim 1.

* * * * *